April 1, 1952     M. C. SIEBELS     2,591,624
TRACTOR HITCH
Filed March 9, 1951
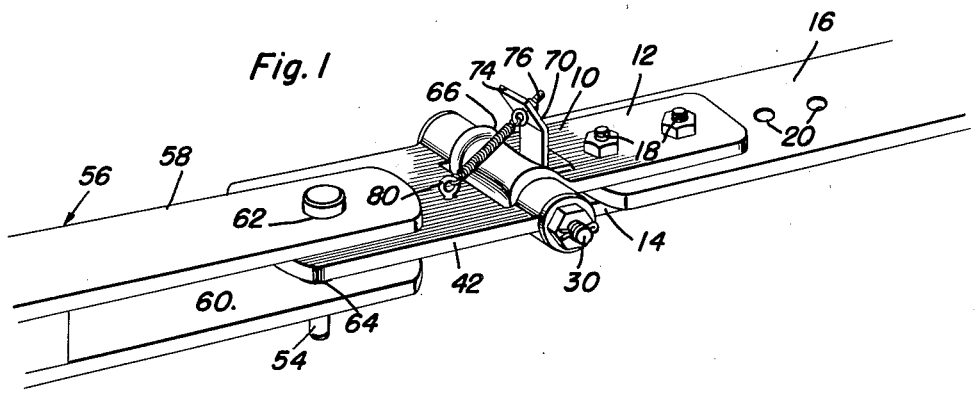
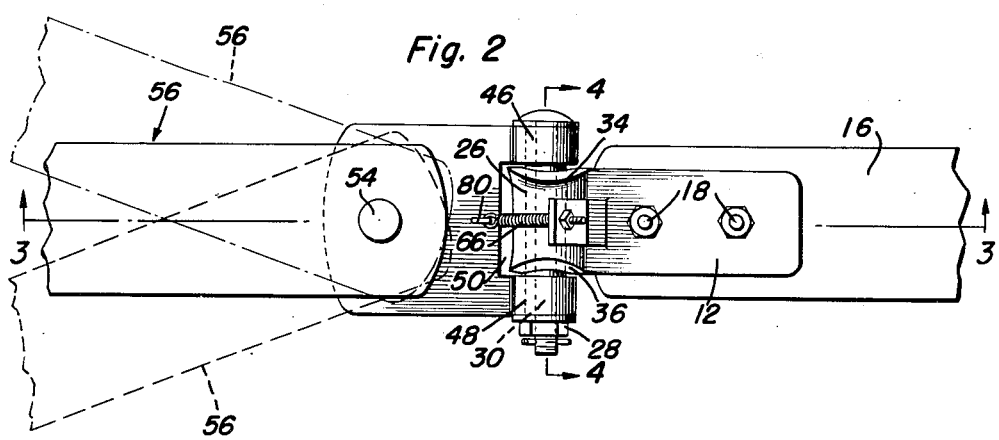
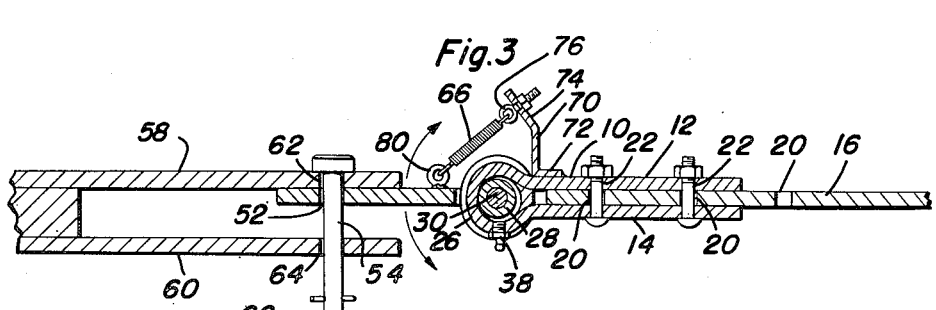
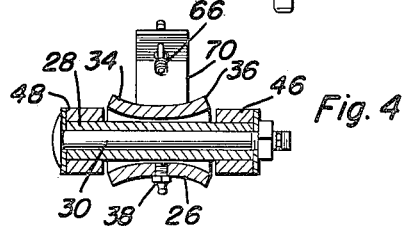
Max C. Siebels
*INVENTOR.*

Patented Apr. 1, 1952

2,591,624

UNITED STATES PATENT OFFICE 2,591,624

TRACTOR HITCH

Max C. Siebels, Minden, Iowa

Application March 9, 1951, Serial No. 214,683

3 Claims. (Cl. 280—33.44)

This invention relates to new and improved hitches for trailer draft connections, the invention having particular utility for fastening rearwardly disposed drawbars on automobiles, tractors and the like to trailers, implements and other vehicles for drawing the same therealong.

In agricultural equipment, wherein tractor-pulled implements are conventional, various types of hitching devices have been described and used heretofore for attaching the implements to the drawbar of the tractor. While these prior hitching mechanisms, on the one hand, are satisfactory where the terrain over which the implements are drawn where fairly level, it has been observed on the other hand, wherein the terrain was hilly or ditched, the hitches tended to spread apart causing bending and oftentimes breakage of the king pin which not only created a hazard but resulted in much lost time and inconvenience.

It is accordingly, the principal object of the present invention to provide a hitching mechanism which is durable and which is constructed so as to be equally safe to use on hilly, ditched lands or terraces as well as on level or even grounds.

Another object of the invention is the provision of a hitching mechanism which eliminates, for all practical purposes, the spreading and breakage of implement tongues and pins on hitching mechanism by providing an improved mechanism which allows for the up, down and sideways movement of the attaching hitch bar, as when the vehicle is going over or through ditches or over terraces, etc.

The invention also consists in certain new and original features of construction and combinations of parts hereinafter set forth and claimed. Various other objects and advantages will be apparent as the invention is described in more detail.

Although the novel features which are believed to be characteristic of this invention will be pointed out more particularly in the claims appended hereto, the invention itself as to its objects and advantages and manner in which it may be carried out, may be better understood by referring to the following description taken in connection with the accompanying drawings in which a specific embodiment thereof has been set forth for purposes of illustration.

In the drawings:

Figure 1 is a perspective view showing a drawbar and implement tongue connected with a hitching mechanism embodying the present invention;

Figure 2 is a plan view of the arrangement shown in Figure 1, and illustrating in dotted lines the various positions which the implement tongue is permitted to assume during use of the hitching mechanism;

Figure 3 is a vertical sectional view taken substantially along the line 3—3 of Figure 2 and looking in the direction of the arrows; and Figure 4 is a sectional view taken on the line 4—4 of Figure 2 and looking in the direction of the arrows.

Referring to the drawings more in detail, the hitching mechanism illustrated in Figures 1 to 3, comprises a U-shaped attaching member, generally designated 10, having upper and lower elongated integral flanges 12 and 14, respectively. The parallel disposed flanges 12 and 14 are suitably fastened to a drawbar 16 of a tractor, not shown, as by means of bolts 18. For adjustably attaching the flange portions 12 and 14 which may be of any suitable lengths, the drawbar 16 is provided with apertures 20 centrally thereof and spaced longitudinally of the drawbar, the holes being adapted to register with similarly spaced apertures 22 on the parallel flanges 12 and 14 for receiving the fastening bolts 18.

Integral with the flanged leg members 12 and 14 and forming the closed end of the U-shaped member 10 is a central cylindrical head portion 26 which is of reduced width with respect to the flanges, and receives a tubular sleeve bearing 28, which, in turn, receives a pivot bolt 30 to permit swinging or tilting of the pivot bolt 30 about a central axis normal to the longitudinal axis of the bolt, the opposite end of the cylindrical head portion 26 is flared outwardly as indicated at 34 and 36. A nozzle fitting 38 is provided centrally of the head portion 26 for suitably introducing lubricating material between the parts.

A swingable connector plate or extension arm 42 is hinged to the pivot bolt 30 as spaced integral eye portions 46 and 48, the connector plate being bifurcated at the inner end forming a cutaway section 50 for receiving the head portion 26 of the U-shaped member 10. The connector plate 42 is swingable through an arc about the pivot bolt 30, as illustrated by the arrows in Figure 3. An aperture 52 is provided in the connector plate to receive a king bolt 54, the bolt being conventionally provided on a tongue, as at 56, on an implement or trailer vehicle. The tongue illustrated comprises a forked member having upper and lower strap-like sections 58 and 60, the same being provided with registering apertures 62 and 64 respectively, for receiving the king bolt 54. The connector plate 42, as will be appreciated, is equally adapted for hingedly fastening to a tongue which comprises a single strap or plate which is suitably apertured to receive the king bolt 54.

To provide for suitably maintaining the hinged connector plate 42 in a horizontally extended position, as illustrated in Figures 1 and 3, a tension coil spring 66 is utilized which is carried by the U-shaped member 10 and attached to the connector plate 42. As illustrated in the drawings, an L-shaped bracket 70 is suitably secured at its lower horizontally extending flange portion 72 to the top of the flange 12 adjacent the head portion 26, the bracket being suitably welded to the top of the plate. The upper end of the bracket 70 is provided with an offset flange portion 74 which is suitably apertured to receive an eye bolt 76 to which is fastened one end of the coil spring 66. The other end of the coil spring is attached to the eye bolt 80 which is, in turn, suitably secured, as by welding, to the top of the connector plate 42. The coil spring 66, as will be understood, is such as to exert a tension force sufficient to maintain the plate 42 in a substantially horizontal position during use of the hitching device. Further, while the hitching device is preferably provided with a coil spring 66 for maintaining the hinge plate 42 horizontal, the spring, if desired, may be omitted.

The hitching device of the invention provides an improved mechanism for attaching trailer implements, and by providing a hinged construction wherein the central head portion 26 with annular outwardly flared portions at opposite ends, the connector plate 42 is permitted to rock about an axis normal to the longitudinal axis of the pin 28, as well as allowing the plate to swing in an arc about the pivot pin whereby a long lasting hitching device is provided, and wherein the tendency to shear or break the connector pin or bolt 30 is practically eliminated.

It will be apparent that the present invention provides a hitching mechanism which is adapted to be used for connecting various types of implements and vehicles as desired. The various uses to which the invention may be put is, of course, contemplated as constituting a part of this invention.

While certain novel features of the invention have been disclosed and are pointed out in the annexed claims, it will be understood that various omissions, substitutions and changes may be made by those skilled in the art without departing from the spirit and scope of this invention.

Having described the invention, what is claimed as new is:

1. A trailer draft connection comprising a U-shaped member having an eye-shaped head portion, a pivot bolt in said eye-shaped head portion, said U-shaped member having apertures in the leg portions for receiving attaching means for securing the same to a drawbar of a vehicle, a connector plate hinged to said pivot bolt, and means for removably fastening said connector plate to the tongue of a vehicle to be drawn along, said eye-shaped head portion comprising outwardly flared portions at opposite ends thereof whereby said pivot bolt is pivotable about and axis normal and centrally of its longitudinal axis.

2. A trailer draft connection as in claim 1 wherein means is provided for maintaining said connector plate normally in a horizontally extended position relative to said pivot bolt.

3. A trailer draft connection comprising an attaching member having an eye-shaped head, a connector plate having a bifurcated end, each furcation being eye-shaped, said eye-shaped head of said attaching member being disposed between said furcations, a pivot bolt extending through said eye-shaped furcations and said head and pivotally connecting said attaching member to said connector plate, said eye-shaped head having outwardly flared ends whereby said pivot bolt is pivotable about an axis normal and centrally of its longitudinal axis.

MAX C. SIEBELS.

REFERENCES CITED

The following references are of record in the file of this patent:

UNITED STATES PATENTS

| Number | Name | Date |
|---|---|---|
| 1,365,013 | Wright | Jan. 11, 1921 |
| 2,130,108 | Struhs | Sept. 13, 1938 |